United States Patent
Lu et al.

(10) Patent No.: US 9,553,316 B2
(45) Date of Patent: Jan. 24, 2017

(54) LITHIUM-OXYGEN BATTERIES INCORPORATING LITHIUM SUPEROXIDE

(71) Applicants: Jun Lu, Bolingbrook, IL (US); Khalil Amine, Oakbrook, IL (US); Larry A. Curtiss, Downers Grove, IL (US); Kah Chun Lau, Darien, IL (US); Yang-Kook Sun, Seoul (KR); Yun Jung Lee, Seoul (KR); Xiangyi Luo, Westmont, IL (US)

(72) Inventors: Jun Lu, Bolingbrook, IL (US); Khalil Amine, Oakbrook, IL (US); Larry A. Curtiss, Downers Grove, IL (US); Kah Chun Lau, Darien, IL (US); Yang-Kook Sun, Seoul (KR); Yun Jung Lee, Seoul (KR); Xiangyi Luo, Westmont, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 34 days.

(21) Appl. No.: 14/667,524

(22) Filed: Mar. 24, 2015

(65) Prior Publication Data
US 2016/0285107 A1 Sep. 29, 2016

(51) Int. Cl.
*H01M 4/90* (2006.01)
*H01M 4/92* (2006.01)

(52) U.S. Cl.
CPC ......... *H01M 4/9016* (2013.01); *H01M 4/9041* (2013.01); *H01M 4/92* (2013.01)

(58) Field of Classification Search
CPC ..... H01M 4/9016; H01M 4/92; H01M 4/9041
See application file for complete search history.

(56) References Cited

U.S. PATENT DOCUMENTS

| | | |
|---|---|---|
| 8,247,325 B2 | 8/2012 | Sun |
| 2014/0077121 A1 | 3/2014 | Sun et al. |
| 2014/0127596 A1 | 5/2014 | Sun et al. |

OTHER PUBLICATIONS

J. Kang, J.-S. Yu, and B. Han. First-Principles Design of Graphene-Based Active Catalysts for Oxygen Reduction and Evolution Reactions in the Aprotic Li—O2 Battery, J. Phys. Chem. Lett. 2016, 7, 2803-2808.*
S. Kumar, S. Chinnathambi and N. Munichandraiah. Ir nanoparticles-anchored reduced graphene oxide as a catalyst for oxygen electrode in Li—O2 cells, New J. Chem., 2015, 39, 7066.*
J. H. Lee, S. G. Kang, H. S. Moon, H. Park, I. T. Kim, S. G. Lee. Adsorption mechanisms of lithium oxides (LixO2) on a graphene-based electrode: A density functional theory approach, Applied Surface Science 351 (2015) 193-202.*
R. Zhang and W. Chen. Non-precious Ir—V bimetallic nanoclusters assembled on reduced graphene nanosheets as catalysts for the oxygen reduction reaction, J. Mater. Chem. A, 2013, 1, 11457.*
J. Lu, Y. J. Lee, X. Luo, K. C. Lau, M. Asadi, H.-H. Wang, S. Brombosz, J. Wen, D. Zhai, Z. Chen, D. J. Miller, Y. S. Jeong, J.-B. Park, Z. Z. Fang, B. Kumar, A. S.-K., Y.-K. Sun, L. A. Curtiss and K. Amine. A lithium-oxygen battery based on lithium superoxide, Nature, Jan. 21, 2016, vol. 529, 377.*
Abraham, et al. "A Polymer Electrolyte-Based Rechargeable Lithium/Oxygen Battery." J. Electrochem. Soc. 143 (1996), 1.
Andrews, L. "Matrix Infrared Spectrum and Bonding in the Lithium Superoxide Molecule, LiO2." J. Am. Chem. Soc. 90 (1968), 7368.
Antolini, E. "Iridium As Catalyst and Cocatalyst for Oxygen Evolution/Reduction in Acidic Polymer Electrolyte Membrane Electrolyzers and Fuel Cells." ACS Catal. 4 (2014), 1426.
Bikkarolla, et al. "Oxygen reduction reaction by electrochemically reduced grapheme oxide." DOI: 10.1039/C4FD00088A, (2014).
Black, et al. "The Role of Catalysts and Peroxide Oxidation in Lithium-Oxygen Batteries." Angew. Chem. Int. Ed. 52 (2013), 392.
Blochl, P.E. "Projector augmented-wave method." Phys. Rev. B 50 (1994), 17953.
Bruce, et al. "Li—O2 and Li—S batteries with high energy storage." Nat. Mater. 11 (2012), 19.
Bryantsev, et al. "Stability of Lithium Superoxide LiO2 in the Gas Phase: Computational Study of Dimerization and Disproportionation Reactions." J. Phys. Chem. A 114 (2010), 8165.
Das et al., "Structure and Stability of Lithium Superoxide Clusters and Relevance to Li—O2 Batteries," J Phys Chem Lett., Mar. 6, 2014; 5(5): 813-819.
Donkersloot, et al. "The crystal structure of IrLi, Ir3Li and LiRh3." J. Less Common Metals 50 (1976), 279.
Gallant, et al., "Influence of Li2O2 morphology on oxygen reduction and evolution kinetics in Li—O2 batteries." Energy Environ. Sci. 6, 2518 (2013).
Grimme, S. "Semiempirical GGA-type density functional constructed with a long-range dispersion correction." J. Comp. Chem. 27 (2006), 1787.
Hartmann, et al., "A rechargeable room-temperature sodium superoxide (NaO2) battery." Nat. Mater. 12 (2013), 228.
Hassoun, et al. "Investigation of the O2 Electrochemistry in a Polymer Electrolyte Solid-State Cell." Angew. Chem. Int. Ed. 50 (2011), 2999.
Hummers, et al. "Preparation of Graphitic Oxide." J. Am. Chem. Soc. 80 (1958), 1339.
Kang, et al. "A Facile Mechanism for Recharging Li2O2 in Li—O2 Batteries." Chem. Mater. (2013), 3328-3336.
Kresse, G.; Furthmuller J. "Efficiency of ab-initio total energy calculations for metals and semiconductors using a plane-wave basis set." Comp Mater Sci (1996), 15-50.
Kresse, G.; Joubert, D. "From ultrasoft pseudopotentials to the projector augmented-wave method." Phys Rev B 59 (1999), 1758-1775.
Kumar, et al. "Gold nanoparticles anchored reduced graphene oxide as catalyst for oxygen electrode of rechargeable Li—O2 cells." RSC Adv. 3 (2013), 21706.
Laiore, et al. "Elucidating the Mechanism of Oxygen Reduction for Lithium-Air Battery Applications." J. Phys. Chem. (2009), 20127.
Lau, et al. "Density Functional Investigation of the Thermodynamic Stability of Lithium Oxide Bulk Crystalline Structures as a Function of Oxygen Pressure." J. Phys. Chem. (2011), 23625.
Lei, et al. "Synthesis of Porous Carbon Supported Palladium Nanoparticle Catalysts by Atomic Layer Deposition: Application for Rechargeable Lithium-O2 Battery." Nano Lett. 13 (2013), 4182.

(Continued)

*Primary Examiner* — Carlos Barcena
(74) *Attorney, Agent, or Firm* — Foley & Lardner LLP

(57) ABSTRACT

A composition includes $LiO_2$, reduced graphene oxide, and a metal catalyst or residue thereof.

15 Claims, 19 Drawing Sheets

(56) References Cited

OTHER PUBLICATIONS

Lin, et al. "Preparation of MG—Li—Al—Zn Master Alloy in Air by Electrolytic Diffusing Method." Electrochemistry 77 (2009), 604.
Lu, et al. "Aprotic and Aqueous Li—O2 Batteries." Chem. Rev. 114 (2014), 5611.
Lu, et al. "Effect of the size-selective silver clusters on lithium peroxide morphology in lithium-oxygen batteries." Nat. Commun. 5 (2014), 4895.
Lu, et al. "Magnetism in Lithium-Oxygen Discharge Product." ChemSusChem 6 (2013), 1196.
Yang et al., "Evidence for lithium superoxide-like species in the discharge product of a Li—O2 battery," Phys Chem Chem Phys. Mar. 21, 2013;15(11): 3764-3771.
Mannix, et al. "Silicon Growth at the Two-Dimensional Limit on Ag(111)." ACS Nano 8 (2014), 7538.
Michon, et al. "Graphene growth on AlN templates on silicon using propane-hydrogen chemical vapor deposition." Appl. Phys. Lett. 104 (2014), 071912.
Mitchell, et al. "Mechanisms of Morphological Evolution of Li2O2 Particles during Electrochemical Growth." J. Phys. Chem. Lett. 4 (2013), 1060.
Mizuno, et al. "Rechargeable Li-Air Batteries with Carbonate-Based Liquid Electrolytes." Electrochem. 78 (2010), 403.
Oh, et al. "Synthesis of a metallic mesoporous pyrochlore as a catalyst for lithium-O2 batteries." Nat. Chem. 4 (2012), 1004.
Ottakam Thotiyl, et al. "The Carbon Electrode in Nonaqueous Li—O2 Cells." J. Am. Chem. Soc. 135 (2012), 494.
Peng, et al. "Oxygen Reactions in a Non-Aqueous Li Electrolyte." Angew. Chem. Int. Ed. 50 (2011), 6351.
Perdew, et al. "Generalized Gradient Approximation Made Simple." Physical Review Letters 77 (1996), 3865-3868.
Pouget, et al. "The Initial Stages of Template-Controlled CaCO3 Formation Revealed by Cryo-TEM." Science 323 (2009), 1455.
Qin, et al. "In situ fabrication of porous-carbon-supported a-MnO2 nanorods at room temperature: application for rechargeable Li—O2 batteries." Energy Environ. Sci. 6 (2013), 519.
Ren, et al. "A Low-Overpotential Potassium-Oxygen Battery Based on Potassium Superoxide." J. Am. Chem. Soc. 135 (2013), 2923.
Ren, et al. "Oxygen reduction reaction catalyst on lithium/air battery discharge performance." J. Mater. Chem. 21 (2011), 10118.
Sangster, et al. "The Li—O (Lithium-Oxygen) System." J. Phase Equilibria 13 (1992), 296.
Selvaraj, et al. "Reduced Graphene Oxide-Polypyrrole Composite as a Catalyst for Oxygen Electrode of High Rate Rechargeable Li—O2 Cells." J. Electrochem. Soc. 161 (2014), A554.
Shao, et al. "Electrocatalysts for Nonaqueous Lithium-Air Batteries: Status, Challenges, and Perspective." Acs Catal. 2 (2012), 844.
Xu, et al. "Self-Assembled Graphene Hydrogel via a One-Step Hydrothermal Process." ACS Nano 4 (2010), 4324.
Zhai, et al. "Disproportionation in Li—O2 Batteries Based on a Large Surface Area Carbon Cathode." J. Am. Chem. Soc. 135 (2013), 15364.
Zhai, et al. "Raman Evidence for Late Stage Disproportionation in a Li2I2O2 Battery." J. Phys. Chem. Lett. 5 (2014), 2705.
Zhuralev, et al. "Structure, Mechanical Stability, and Chemical Bond in Alkali Metal Oxides." J. Struct. Chem. 51 (2010), 1005.

* cited by examiner

FIG. 3E/F/G

FIG. 5A
FIG. 5B
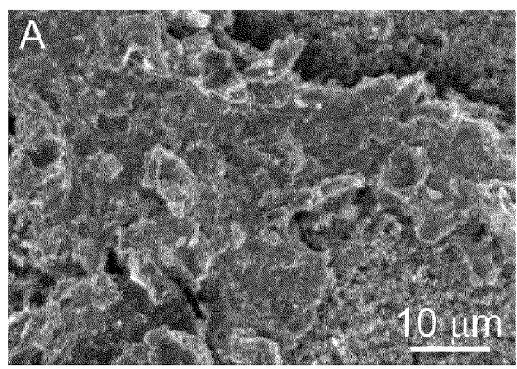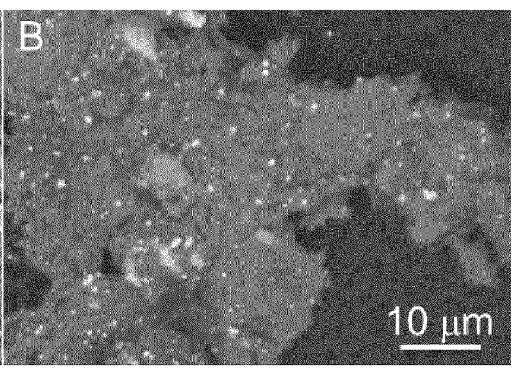

LITHIUM-OXYGEN BATTERIES INCORPORATING LITHIUM SUPEROXIDE

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to the production of lithium superoxide ($LiO_2$) which is free of other lithium-oxygen compounds.

BACKGROUND

There has been a significant interest in lithium superoxide ($LiO_2$), due to recent research into lithium-oxygen batteries, and the possibility that lithium superoxide may be an intermediate in the formation of lithium peroxide in lithium air cells. The first step in the oxygen reduction reaction (ORR) in a lithium air cell has been speculated to be the reduction of $O_2$ to $O_2^-$, through a one-electron transfer, which is followed by the reaction with a lithium cation to form $LiO_2$ (Eqs. 1 and 2):

$$O_2 + e^- \rightarrow O_2^- \quad \text{(Eq. 1)}$$

$$O_2^- + Li^+ \rightarrow LiO_2 \quad \text{(Eq. 2)}$$

Lithium peroxide ($Li_2O_2$) can be then formed by the reaction of $LiO_2$ with $Li^+$ through a second electron transfer, as shown in Eq. 3:

$$LiO_2 + e^- + Li^+ \rightarrow Li_2O_2 \quad \text{(Eq. 3)}$$

Alternatively, $Li_2O_2$ may be generated via the disproportionation reaction of $LiO_2$:

$$2LiO_2 \rightarrow Li_2O_2 + O_2 \quad \text{(Eq. 4)}$$

SUMMARY

In one aspect, a composition includes $LiO_2$, reduced graphene oxide, and a metal catalyst or residue thereof. The composition may be free of $Li_2O_2$ and $Li_2O$. In any of the above embodiments, the metal catalyst includes a metal that forms an intermetallic phase with lithium, and the intermetallic phase has an orthorhombic structure. In any of the above embodiments, the metal catalyst includes Ir, Ru, Pt, or Pd. In any of the above embodiments, the metal catalyst includes Ir. In any of the above embodiments, the $LiO_2$ may be crystalline $LiO_2$. In any of the above embodiments, the intermetallic phase may be $Ir_3Li$.

In another aspect, an electrochemical cell includes an anode including lithium metal; a cathode including $LiO_2$ that is substantially free of $Li_2O_2$ and $Li_2O$; and an electrolyte. In some embodiments, the cathode may include a carbon-based material. In any of the above embodiments, the carbon-based material may include graphene oxide. The electrolyte may include at least a solvent and a lithium salt. In any of the above embodiments, the solvent may include an ether-based solvent, a fluorinated ether-based solvent, an oligo(ethylene oxide) solvent, or a mixture of any two or more thereof. In any of the above embodiments, the lithium salt may include $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$), lithium alkyl fluorophosphates, $Li(C_2O_4)_2$, $LiBF_2C_2O_4$, $Li_2B_{12}X_{12-p}H_p$, $Li_2B_{10}X_{10-y}H_y$, or a mixture of any two or more lithium salts, where X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10.

In another aspect, an electrochemical cell is provided. The cell may include an anode comprising lithium metal; a cathode comprising a solid phase oxygen generator; and an electrolyte. The solid phase oxygen generator may be $LiO_2$. In any such embodiments, the cathode may include a carbon-based material. In any such embodiments, the carbon-based material comprises graphene oxide. In any such embodiments, the electrolyte may include a solvent and a lithium salt. In any such embodiments, the cell may be a closed cell.

In another aspect, a process is provided for forming $LiO_2$. The process may include providing an electrochemical cell, the electrochemical cell comprising a porous oxygen carbon cathode, a lithium anode, a current collector, and an electrolyte; and discharging the electrochemical cell to form a discharge product. In such embodiments, the discharge product includes $LiO_2$, the porous oxygen carbon cathode includes reduced graphene oxide and a catalyst; and the discharge product is free of $Li_2O$ and $Li_2O_2$.

BRIEF DESCRIPTION OF THE DRAWINGS

FIG. 1A is an SEM image of a pristine rGO powder, according to the examples. FIG. 1B is an SEM image of an Ir-rGO composite, according to the examples. FIGS. 1C and 1D are TEM images of the Ir-rGO composite, showing Ir nanoparticles of less than 2 nm, according to the examples.

FIG. 2A is a voltage profile of an Ir-rGO cathode, according to the examples. FIG. 2B is a voltage profile of an rGO cathode, according to the examples. FIG. 2C is an SEM image of a discharge product of an Ir-rGO electrode, according to the examples. FIG. 2D is a TEM image of discharge product of an Ir-rGO, according to the examples. FIGS. 2C and 2D are from the first discharge for the electrode. The current density is 100 mA/g, and the time control over 10 hrs.

FIG. 3A is an illustration of HE-XRD patterns of discharge products from Ir-rGO as a function of the aging time. FIG. 3B is a Raman spectra of a discharge product from Ir-rGO cathode from the $1^{st}$ and $2^{nd}$ discharges, according to the examples. FIG. 3C is a graph of voltage plots for the Ir-rGO cathode discharged first in $O_2$ to a capacity of 1000 mAh/g and then the discharged cathode was continuously discharged in Ar during which it attained a capacity 970 mAh/g. FIG. 3D is an HE-XRD pattern of cathode resulting from both discharges in the sample illustrated in FIG. 3C. FIG. 3E is a TEM image of an Ir agglomerate after $1^{st}$ discharge. FIG. 3F is an HR-TEM image of the Ir agglomerate surface, and FIG. 3G is the corresponding ED pattern, which provide the evidence of the formation of the $Ir_3Li$ intermetallic. All of FIG. 3 are according to the examples.

FIG. 4A is a barrier for desorption of an $O_2$ molecule from the (101) $LiO_2$ surface in vacuum, according to the examples. FIG. 4B includes ab initio molecular dynamics (MD) simulations showing the thermal stability of the (111) and (101) $LiO_2$ surfaces in vacuum at room temperature, according to the examples. FIG. 4C is a barrier for desorption of an $O_2$ molecule from an amorphous $LiO_2$ surface in vacuum, according to the examples. FIG. 4D illustrates density of states showing that bulk crystalline $LiO_2$ is a half-metal, according to the examples.

FIG. 5A is a secondary electron image of Ir-rGO, and FIG. 5B is a backscattering image of the sample, according to the examples.

DETAILED DESCRIPTION

Figure 1:
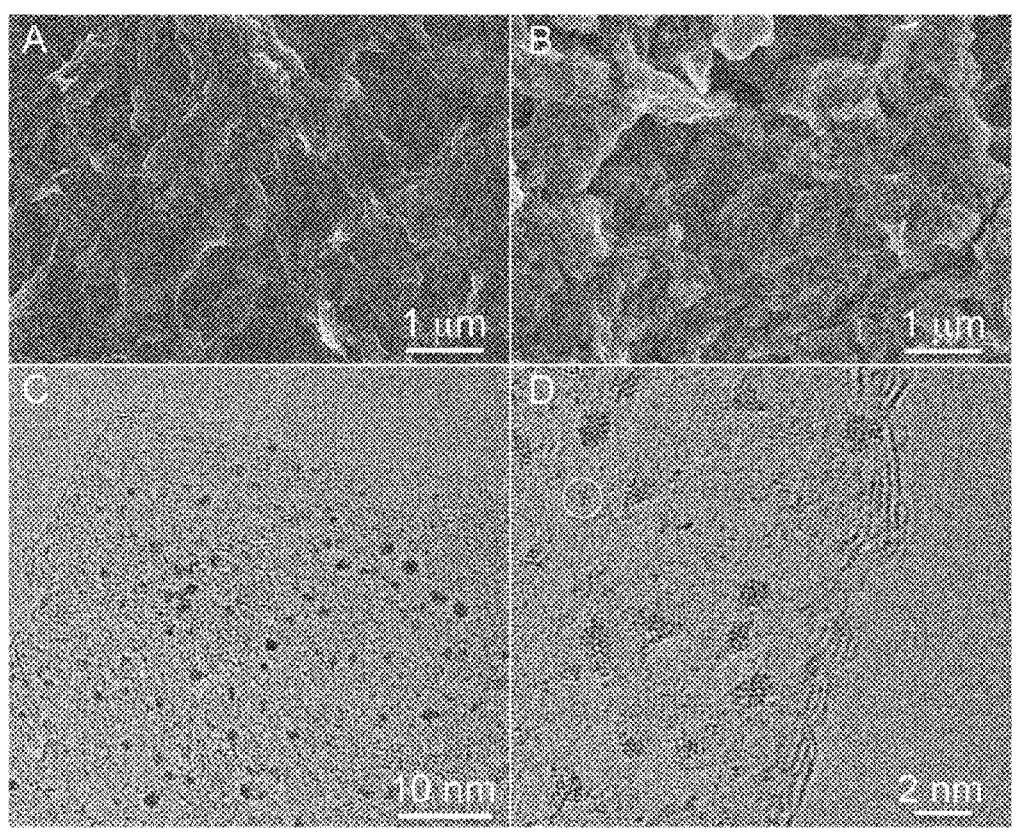
FIGS. 1A, 1B, 1C, and 1D are illustrations of cathode materials.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Although lithium superoxide ($LiO_2$) is believed to be an intermediate formed during lithium air battery discharge, ultimately becoming lithium peroxide, $Li_2O_2$, it is not believed that $LiO_2$ has ever been observed in its pure state at other than very low temperatures. Provided herein is a crystalline lithium superoxide that is free of both $Li_2O_2$ and lithium oxide ($Li_2O$). The lithium peroxide is formed on reduced graphene oxide (rGO). Metal catalysts may also be used to assist in the formation of the $LiO_2$. It has been found that $LiO_2$ may be formed as a discharge product from single electron transfer without further electron transfer or disproportionation to form $Li_2O_2$. High energy X-ray diffraction (HE-XRD) has been used to determine that there is no evidence of $Li_2O_2$ or $Li_2O$ in the $LiO_2$ formed in the process. The HE-XRD studies as a function of time also shows that $LiO_2$ is stable in its crystalline form. The $LiO_2$ is stable for up to and at least one week of aging, in the presence of electrolyte. The results provide evidence that $LiO_2$ is stable enough that it can be repeatedly charged and discharged with a very low charge potential (about 3.2 V). Accordingly, in another aspect, a lithium superoxide-based battery is provided.

The process of forming the $LiO_2$ utilizes an electrochemical cell. The electrochemical cell has a reduced graphene oxide-based air cathode containing a catalyst, a lithium anode, a current collector, and the electrolyte is an ether-based solvent with a lithium salt. The cell is cycled for a predetermined time, and at a predetermined capacity and current density.

For example, a single cycle of the cell may be conducted for greater than 1 hour. In some embodiments, the cycle is conducted for from 1 hour to 48 hours. In some embodiments, the cycle is conducted for from 2 hours to 24 hours. In some embodiments, the cycle is conducted for from 12 hours to 24 hours. In yet a further embodiment, the cycle is conducted for about 20 hours. Accordingly, cycling for 35 cycles, in some cases may be 35×20, or about 700 hours. In any of the above embodiments, the capacity at which the cycling is conducted by be from about 200 mAh/g to about 2500 mAh/g. This may include from about 500 mAh/g to about 1500 mAh/g, and about 1000 mAh/g. The current density for the cycling, in any of the above embodiments, may be from about 10 mA/h to about 500 mA/h. This may include, but is not limited to, from about 25 mA/h to about 250 mA/h, and about 100 mA/h.

The metal catalyst is a transition metal catalyst that upon discharge will form an intermetallic compound with lithium. The intermetallic compound that is formed may have an orthorhombic structure that that will facilitate epitaxial growth of lithium superoxide on the surface of the lattice of the intermetallic compound.

As noted above, the porous oxygen carbon cathode may include a metal catalyst. Illustrative metal catalysts may include, but are not limited to Rh, Ir, and Pt. In some embodiments, the metal catalyst is Ir.

The lithium superoxide produced may find application in lithium air batteries, as a cathode material for a closed Li-air battery systems without need for a source of oxygen for the storage of oxygen, in solid form with low molecular weight, and as a lithium storage material to pre-lithiate high-energy anodes.

In one aspect, a composition is provided including lithium superoxide ($LiO_2$), reduced graphene oxide, and a metal catalyst or residue thereof. As used herein, the residue of a catalyst is the spent catalyst. It may be the catalyst or a decomposition product thereof that may or may not be characterized. In some embodiments, the $LiO_2$ is crystalline.

In any of the embodiments described herein, the composition may be free of other lithium-oxygen compounds such as lithium peroxide ($Li_2O_2$) or lithium oxide ($Li_2O$). As used herein, the phrase "free-of" means that in the compositions, the $Li_2O_2$ or the $Li_2O$ are undetectable using spectroscopic methods. In any of the above embodiments, "free of" may mean greater than 98% purity of the $LiO_2$. In any of the above embodiments, "free of" may mean greater than 99% purity of the $LiO_2$. In any of the above embodiments, "free of" may mean greater than 99.9% purity of the $LiO_2$. In any of the above embodiments, "free of" may mean 100% purity of the $LiO_2$.

The metal catalyst may be a metal, metal compound, or metal alloy that forms an intermetallic phase with lithium. The intermetallic phase may have an orthorhombic structure. Illustrative metal catalysts may include, but are not limited to, Ir, Ru, Os, Ni, Pt, or Pd. In any of the above embodiments, the metal catalyst may include Ir. Where the catalyst is Ir, the intermetallic phase that is formed may be $Ir_3Li$.

In another aspect, an electrochemical cell is provided. The electrochemical cell may include an anode, a cathode, and an electrolyte, where the anode may be lithium metal, and the cathode described above is porous for oxygen transport for reaction with lithium cations. As used herein, a solid phase oxygen generator is a material that upon discharge of the cell provides oxygen for consumption by the lithium metal anode.

In the electrochemical cells, the cathode may also include a carbon-based material. For example, a porous carbon-based material may be used. Illustrative materials for use as the carbon-based material include, but are not limited to, reduced graphene oxide.

Illustrative electrolytes are aprotic and may include a solvent and a lithium salt in addition to other additives that may be present. The solvent may be an aprotic solvent such as an ether-based solvent, a fluorinated ether-based solvent, an oligo(ethylene oxide) solvent, or a mixture of any two or more thereof. Illustrative solvents include, but are not limited to glyme, diglyme, tetrahydrofuran, tetraethyletheylene glycol dimethylether, tri(ethylene glycol)-substituted methyltrimethyl silane (1NM3), ethylene glycol-substituted methyltrimethyl silane (1NM1), and di(ethylene glycol)-substituted methyltrimethyl silane (1NM2). Other illustrative solvents include, but are not limited to, solvents such as acetonitrile (ACN), dimethyl sulfoxide (DMSO), dimethylformamide (DMF), triethyl phosphate, N,N-dimethylacetamide (DMA), N-methyl pyrrolidone (NMP), methoxybenzene, siloxanes, and ionic liquids.

Illustrative lithium salts include, but are not limited to, $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$), lithium alkyl fluorophosphates, $Li(C_2O_4)_2$, $LiBF_2C_2O_4$, $Li_2B_{12}X_{12-p}H_p$, $Li_2B_{10}X_{10-y}H_y$, or a mixture of any two or more lithium salts, where X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10.

In another aspect, a process is provided for forming $LiO_2$. The process includes providing an electrochemical cell, where the electrochemical cell includes a porous oxygen carbon cathode, a lithium anode, a current collector, and an electrolyte. The porous oxygen carbon cathode may include both reduced graphene oxide and a metal catalyst. The following step is discharging of the electrochemical cell form a discharge product. The discharge product includes the $LiO_2$, and the $LiO_2$ is free of $Li_2O$ and $Li_2O_2$.

As noted above, "free of" indicates, at least in some embodiments, that the $LiO_2$ is spectroscopically pure. Accordingly, the $LiO_2$ may exhibit a Raman absorption peak at 1123 $cm^{-1}$. In addition, to further clarify "free of" x-ray diffraction may be used to evidence the purity of the $LiO_2$. For example, the x-ray diffraction may have peaks of 2θ of 2.530; 2.590; 2.710; 3.000; 3.060; 3.250; 3.500; 3.750; and/or 4.120. Alternatively, a pure sample of $LiO_2$ may be void peaks of 2θ of 2.321, 2.464, 2.851, 3.400, 4.020, and 4.747.

The discharging may further include cycling of the electrochemical cell, i.e. discharging and charging cycles. As illustrated above, a single cycle may be from 1 hour to 48 hours, or multiple cycles may endure for hundreds of hours. The cycling may also be conducted at a predetermined capacity. For example, the capacity may be greater than 100 mAh/g. This may include, but is not limited to, a capacity from 100 mAH/g to about 2000 mAh/g, or a capacity of about 1000 mAh/g. The cycling may also include cycling the electrochemical cell at a predetermined current density. For example, the current density may be greater than 10 mA/h. This may include, but is not limited to cycling at a current density of 10 mA/h to 500 mA/h, or cycling the electrochemical cell at a current density of about 100 mA/h.

The present invention, thus generally described, will be understood more readily by reference to the following examples, which are provided by way of illustration and are not intended to be limiting of the present invention.

EXAMPLES

Example 1

Preparation and Electrochemical Evaluation of rGO (reduced graphene oxide) and Ir-rGO cathodes (reduced graphene oxide having nanoparticulate iridium). Graphene oxide was prepared by a modified Hummers method. See Hummers, W. S. et al. *J. Am. Chem. Soc.* 80, 1339 (1958) and Xu, Y. et al. *ACS Nano* 4, 4324 (2010). The graphene oxide was then dispersed (1 mg/ml) in ethylene glycol (EG) with the aid of horn sonication for 1 hour. The pH of the graphene oxide dispersion was adjusted to 13 with NaOH (2.5 M in EG). The temperature of the dispersion was then increased to 120° C., and $NaBH_4$ dissolved in EG was injected slowly. The resultant reduced solution was held at temperature for 1 hour, and then cooled to room temperature. The precipitate was filtered, washed, and dried under vacuum.

$IrCl_3 \cdot H_2O$ was then added to 100 ml of an aqueous dispersion of the reduced graphene oxide (0.67 mg/ml) from above, and the resultant mixture was stirred for 2 hours. The solution was then transferred to a Teflon®-lined autoclave and reacted hydrothermally at 180° C. for 12 hours. The precipitate, Ir-rGO (iridium-reduced graphene oxide), was filtered, washed, and dried under vacuum.

Electrochemical characterization of the Ir-rGO was carried out using a Swagelok-type cell. The cell included a lithium metal anode, an electrolyte (1M $LiCF_3SO_3$ in tetraethylene glycol dimethyl ether (TEGDME) impregnated into a glass fiber separator), and a porous cathode (7/16 inch diameter). The cells were sealed except for the aluminum grid window that exposed the porous cathode to 1 bar $O_2$ pressure. The electrochemical measurements were carried out using a MACCOR cycler. The discharge-charge performance was conducted over the voltage range of 2.2V to 4.5V, at a constant current of 100 mA/g, and where the cell was maintained in 1 bar $O_2$ atmosphere to avoid negative effects of humidity and $CO_2$.

Characterization.

SEM images of the rGO and Ir-rGO composite (FIGS. 1A and 1B, respectively) reveal porous 3-dimensional (3D) networks of rGO composed of wrinkled 2D rGO sheets. FIGS. 1C and 1D show TEM images of the Ir nanoparticles on rGO, indicating that the well-dispersed Ir nanoparticles decorated on rGO are very small (<2 nm), with evidence for the presence of some small Ir clusters (circled in FIG. 1D), and possibly even atoms. A backscattering image (see FIG. 5B) shows some scattered larger Ir particles of about 500 nm in size, which may be due to an agglomeration of smaller nanoparticles.

Performance.

Figure 2A:
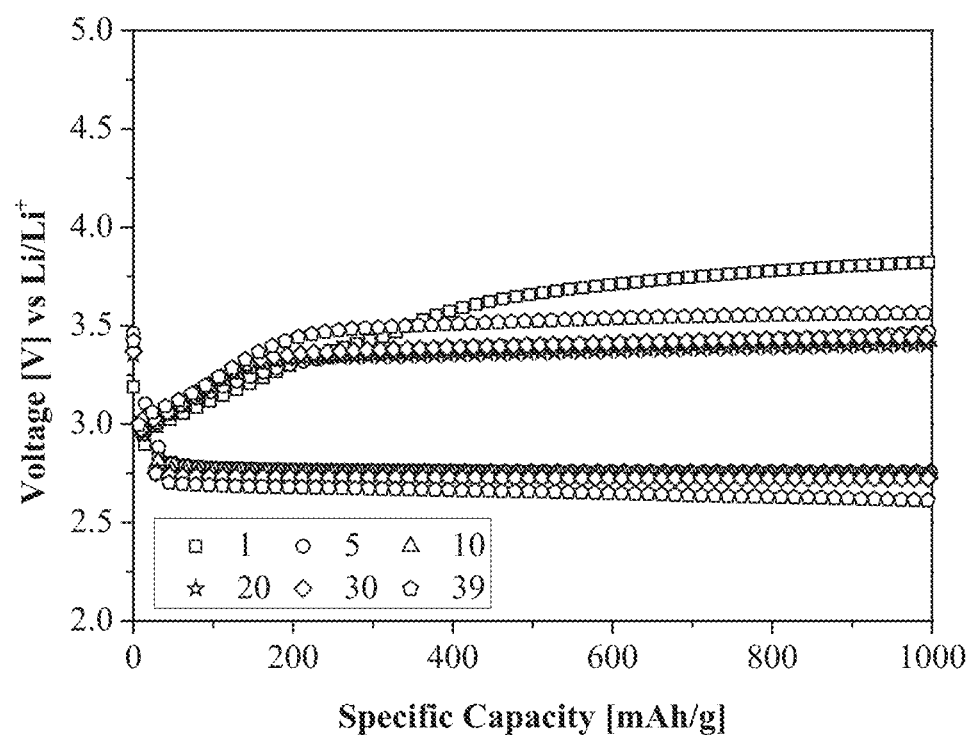
FIGS. 2A, 2B, 2C, and 2D are illustrations for rGO- and iridium-rGO-based cathodes.
Figure 2B:
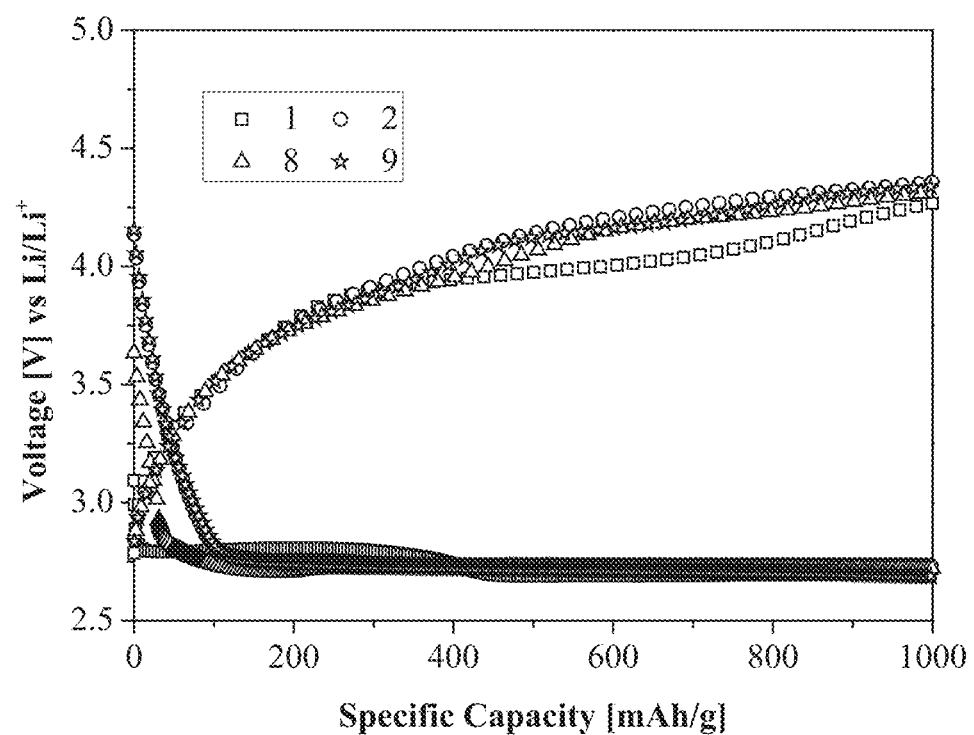

The performance of the rGO and Ir-rGO cathodes was examined using a Swagelok-type cell composed of a lithium metal anode, electrolyte (1M $LiCF_3SO_3$ in tetraethylene glycol dimethyl ether (TEGDME) impregnated into a glass fiber separator, and a porous cathode (see supplementary materials). A current density of 100 mA/g is used for both discharge and charge and the cell was run under time control of 10 hours (capacity of 1000 mAh/g). It should be pointed out that the expression of the specific capacity (mAh/g) and the current density (mA/g) are based on the active materials of the $O_2$ electrodes. FIGS. 2A and 2B show voltage profiles for the Ir-rGO and rGO cathode architectures, respectively. The Ir-rGO discharge product shows a very low charge potential of about 3.2 V that rises to 3.5 V over 40 cycles leading to over 85% efficiency in this system (FIG. 2A). The voltage profile of the rGO cathode shows a much larger charge potential of about 4.2 V with lower efficiency of 67% (FIG. 2B).

Figure 2C:
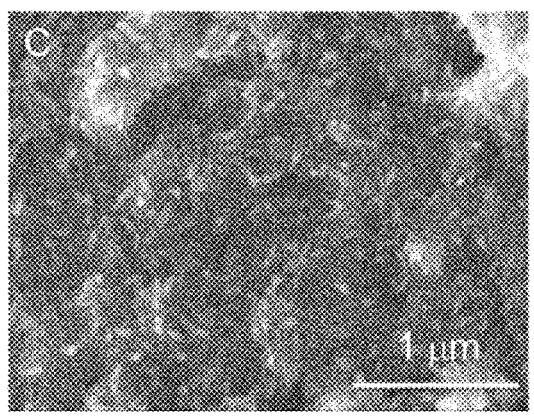
Figure 2D:
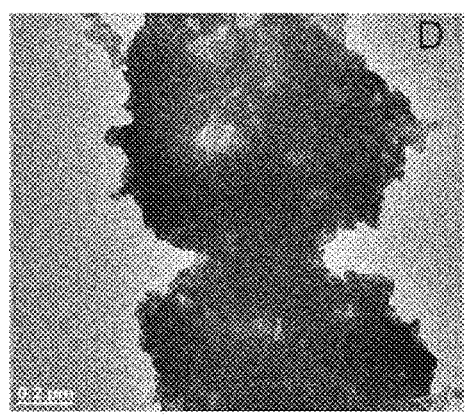
Figure 13:
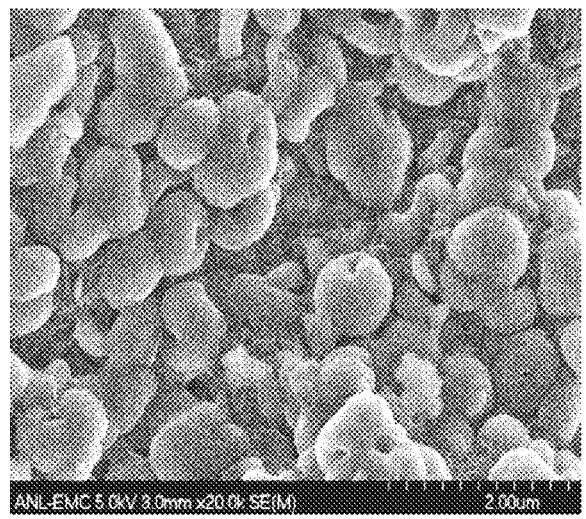
FIG. 13 is an SEM image of discharge product on deep discharge showing toroidal morphology.

The discharge product resulting from the Ir-rGO cathode was examined using SEM, HE-XRD, TEM and Raman with the results shown in FIGS. 2C/D and 3C/D. The SEM image in FIG. 2C shows the Ir-rGO cathode after discharge (2.75 V) from the first cycle (1000 mAh/g capacity). This image indicates that the discharge product resulting from the Ir-rGO-based cathode has mainly nanoparticles with needle-like or rod-like morphology, although other shapes such as cubic cannot be ruled out. This is also observed by the TEM image of a part of the discharge product that appears to be on the Ir-rGO nanostructures (FIG. 2D). The discharge product from the rGO-based cathode has a range of morphologies including toroids and nanoparticles (See FIG. 13).

Figure 14A:
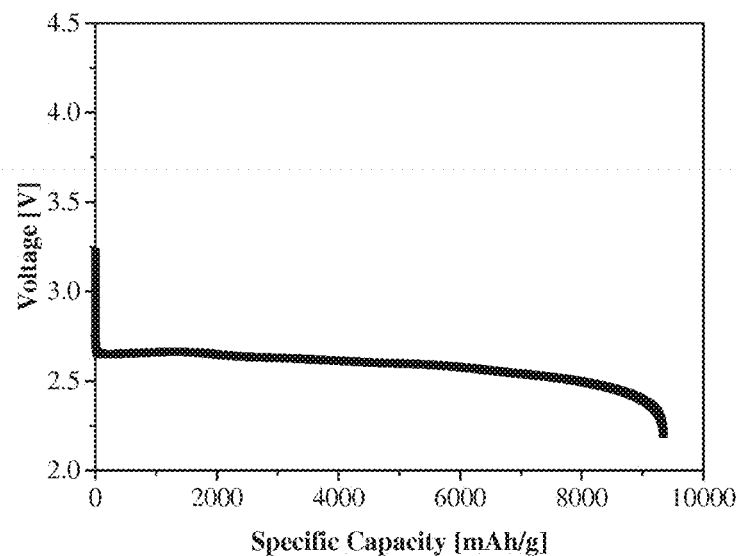
FIG. 14A is a voltage profile for deep discharge (about 9500 mAH/g at a current density of 100 mA/g) on the Ir-rGO cathode.
Figure 14B:
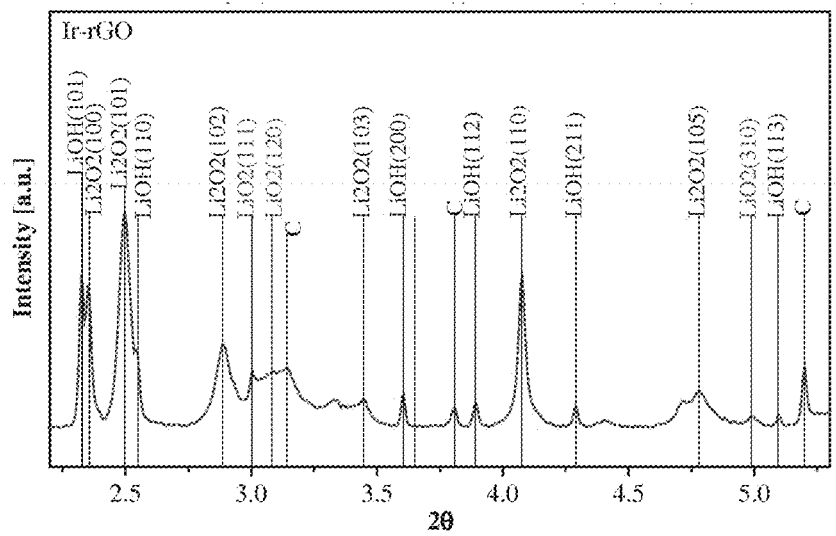
FIG. 14B is an XRD pattern for discharge product on deep discharge showing presence of $Li_2O_2$, $LiO_2$, and LiOH.
Figure 15A:
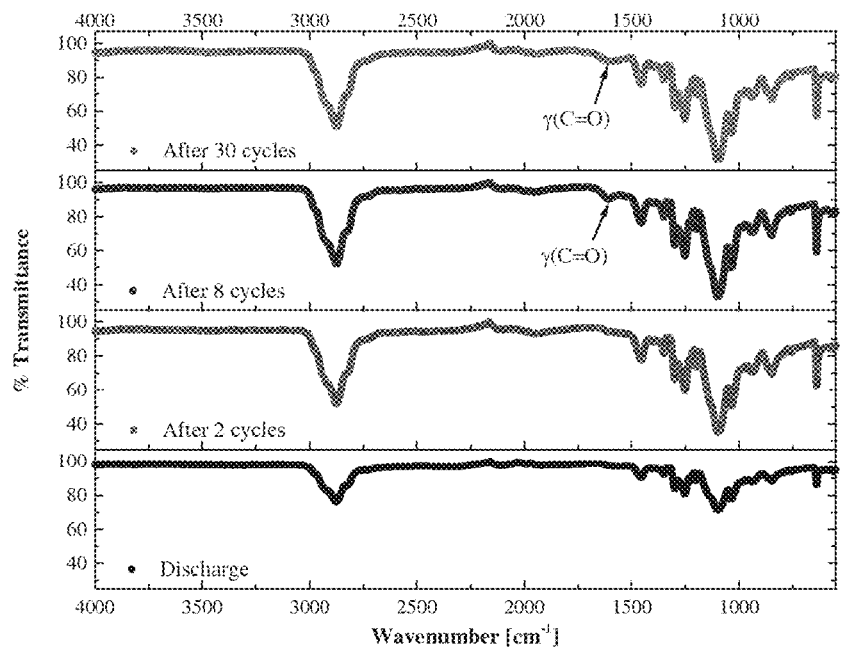
FIGS. 15A and 15B are FTIR spectra of (A) charged Ir-rGO cathode and (B) separators (from discharge cathode capacity of 1000 mAh/g, and a current density of 100 mAh/g) after 2, 8, 30 cycles.
Figure 15B:
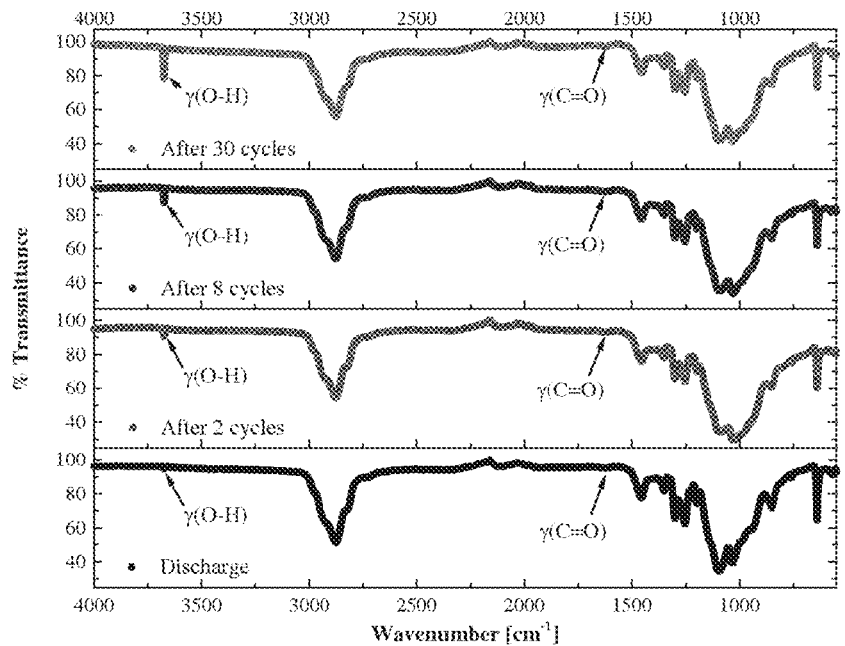

FIG. 14A is a voltage profile for deep discharge (about 9500 mAH/g at a current density of 100 mA/g) on the Ir-rGO cathode. FIG. 14B is an XRD pattern for discharge product on deep discharge showing presence of $Li_2O_2$, $LiO_2$, and LiOH. When the Ir-rGO cell is run to deep discharge of 2.2 V and about 9,500 mAh/g capacity the HE-XRD data shows evidence for the presence of $LiO_2$, $Li_2O_2$, and LiOH with a toroidal morphology. FIGS. 15A and 15B are FTIR spectra of (A) charged Ir-rGO cathode and (B) separators (from discharge cathode capacity of 1000 mAh/g, and a current density of 100 mAh/g) after 2, 8, 30 cycles.

Figure 3A:
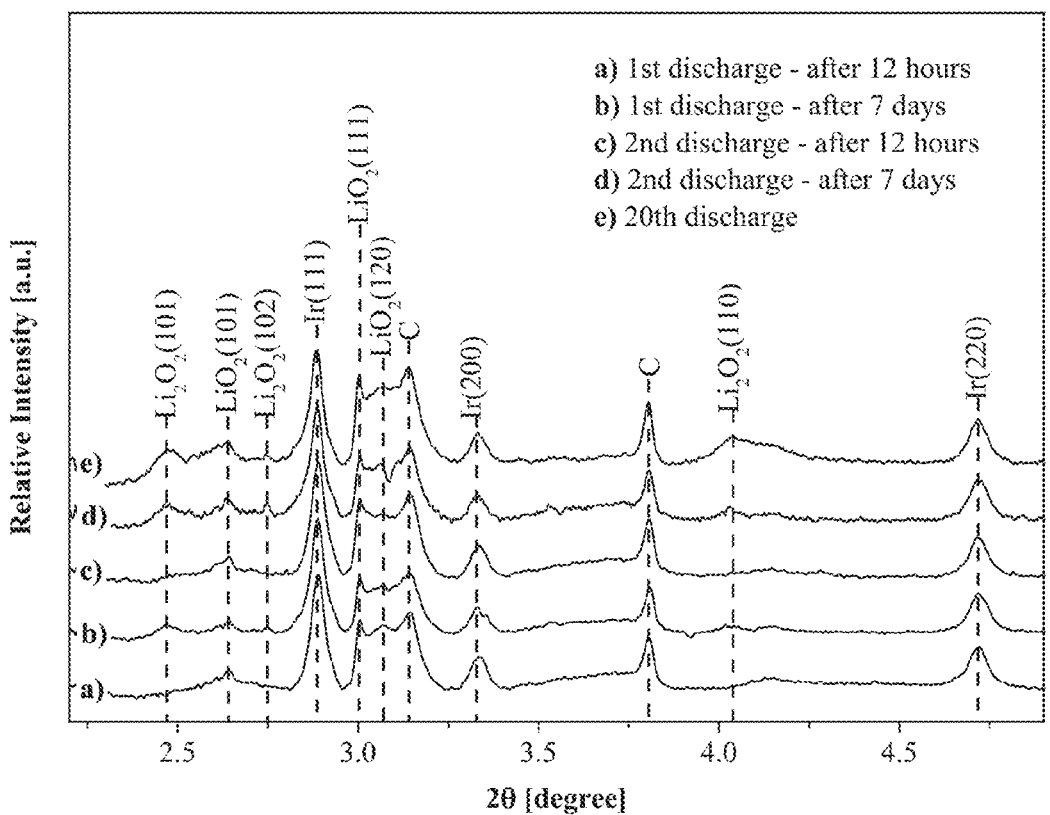
FIGS. 3A, 3B, 3C, and 3D are illustrations of performance tests of iridium-rGO-based cathodes.
Figure 7A:
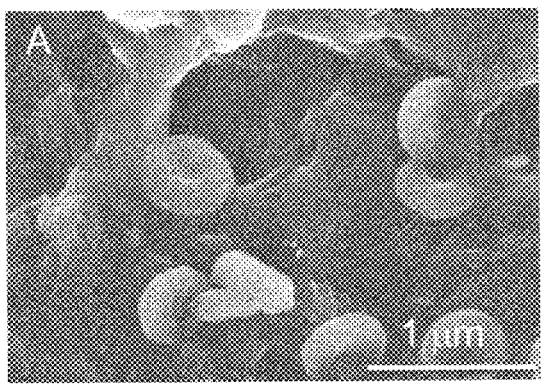
FIG. 7A is an SEM image of a discharge product from a rGO cathode.

FIG. 7A shows that when rGO is used without the Ir nanoparticles, the discharge product has $Li_2O_2$, $LiO_2$, and LiOH. This confirms the role of Ir in $LiO_2$ formation. The morphology is different—also toroids (FIG. 7) rather than nanoneedles/nanorods for $LiO_2$. In FIG. 3A the peroxide is listed as well as in 7B. Without being bound by theory, while the material initially includes $LiO_2$ without contamination, FIG. 3A illustrates that the peroxide appears after 7 days of aging due to disproportionation. Additionally, the peroxide appears after degradation of the catalyst.

The XRD pattern in FIG. 3A for the discharge product on the Ir-rGO cathode (1000 mAh/g capacity) during the first cycle shows peaks corresponding to crystalline $LiO_2$ [(101), (111), (120)], and no evidence for peaks corresponding to $Li_2O_2$. The identification of the $LiO_2$ peaks is based on a theoretical XRD pattern derived from the DFT predicted crystalline $LiO_2$ structure (See FIG. 8) from Lau et al. *J. Phys. Chem. C* 115, 23625 (2011), and Zhuravlev et al. *J. Struct. Chem.* 51, 1005 (2010), as no experimental XRD pattern has been reported. $LiO_2$ may be characterized by $2\theta$ peaks according to the following table:

| XRD Peak | 2θ (degree) |
| --- | --- |
| (011) | 2.530 |
| (020) | 2.590 |
| (101) | 2.710 |
| (111) | 3.000 |
| (120) | 3.060 |
| (200) | 3.250 |
| (210) | 3.500 |
| (121) | 3.750 |
| (211) | 4.120 |
| (130) | 4.220 |
| (002) | 4.340 |
| (031) | 4.450 |
| (221) | 4.690 |
| (131) | 4.740 |
| (112) | 4.810 |
| (022) | 5.050 |
| (230) | 5.070 |

At a $\lambda=0.11165$ Å, $Li_2O_2$ crystals are characterized according to the following table (P63_mmc):

| XRD Peak | 2θ (degree) | Intensity (rel) |
| --- | --- | --- |
| (100) | 2.321 | 33.70 |
| (101) | 2.464 | 100.00 |
| (102) | 2.851 | 29.96 |
| (004) | 3.313 | 4.18 |
| (103) | 3.400 | 18.46 |
| (110) | 4.020 | 51.21 |
| (104) | 4.045 | 13.23 |
| (112) | 4.348 | 3.65 |
| (200) | 4.643 | 2.37 |
| (201) | 4.716 | 7.62 |
| (105) | 4.747 | 29.54 |
| (202) | 4.929 | 5.01 |
| (006) | 4.970 | 2.40 |

Iridium is characterized according to the following x-ray diffraction data:

| XRD Peak | 2 θ (degree) | Intensity (rel) |
|---|---|---|
| (111) | 2.87 | 100.00 |
| (200) | 3.31 | 51.76 |
| (220) | 4.69 | 39.99 |

Figure 3B:
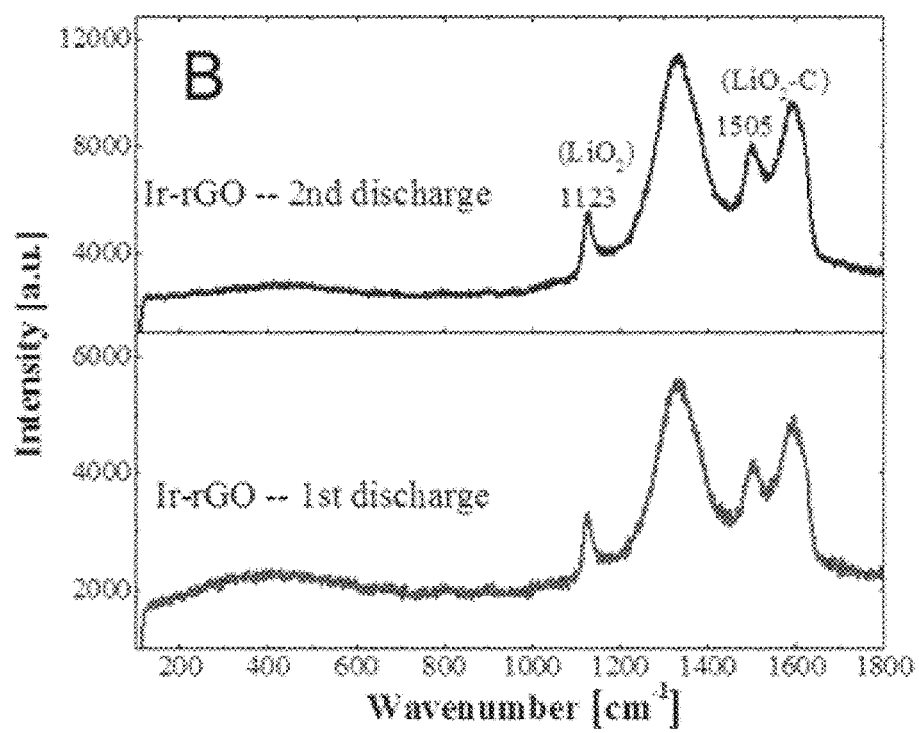

The $LiO_2$ structure is orthorhombic and is similar to that of $NaO_2$, but different from $KO_2$, which is in tetragonal phase at room temperature. The standard $Li_2O_2$ XRD pattern was used to determine the absence of $Li_2O_2$. The Raman spectra of the discharge product of the Ir-rGO cathode in FIG. 3B features a peak at 1123 $cm^{-1}$, consistent with the signature of $LiO_2$, and a peak at 1505 $cm^{-1}$ that is attributed to the strong interaction between $LiO_2$ and graphitic carbon surface. No evidence of lithium peroxide was found. Evidence for the stability of the lithium superoxide is seen in the XRD pattern 48 hours later, as it remains unchanged from original XRD patterns. In contrast, the XRD pattern (See FIG. 7B) for the discharge product on the rGO cathode without Ir added (1000 mAh/g capacity) during the first cycle shows peaks corresponding to both crystalline $LiO_2$ [(101), (111), (120)] and $Li_2O_2$ [(101), (102), (103) and (110)].

Figure 3C:
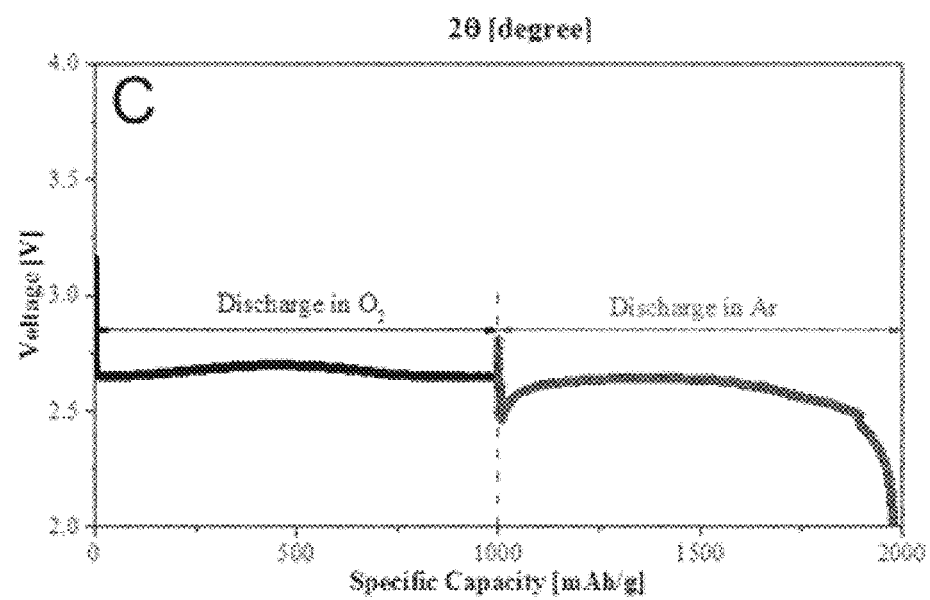
Figure 3D:
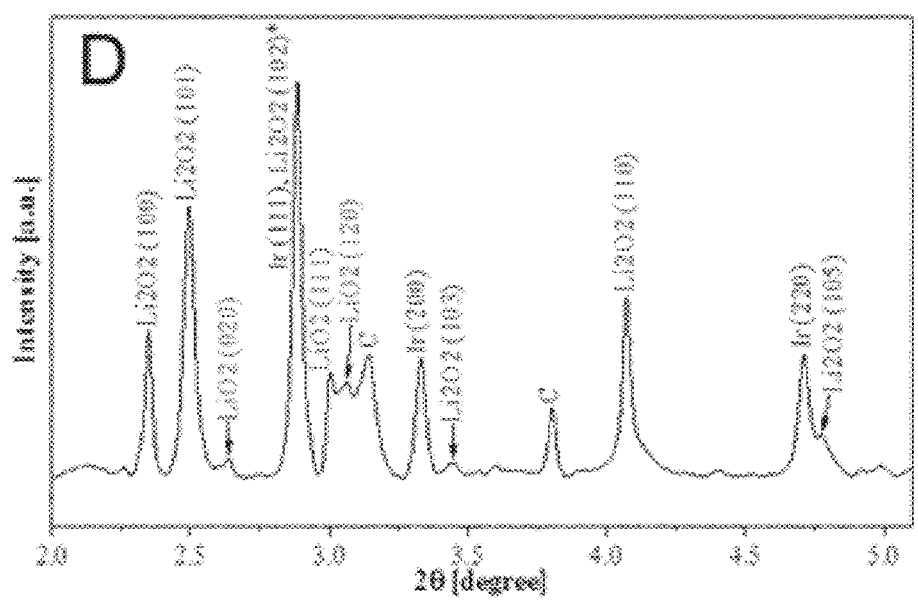
Figure 3D:
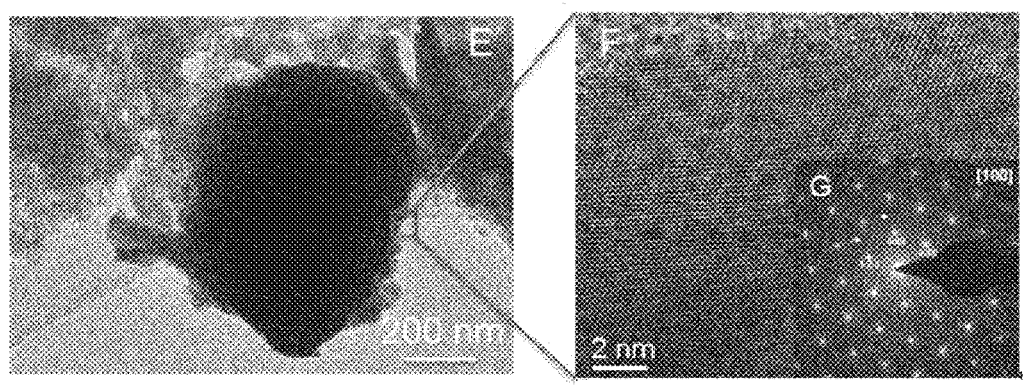

Further evidence that the discharge product is $LiO_2$ from the Ir-rGO cathode was obtained by an experiment in which Li was electrochemically added to the discharge product without the presence of $O_2$ (i.e. the $O_2$ was replaced by Ar). The voltage profile is shown in FIG. 3C for this discharge process, along with that of the initial discharge process (to 1000 mAh/g). The XRD of the resulting product with no $O_2$ in the cell is shown in FIG. 3D and reveals strong peaks for $Li_2O_2$, thus indicating a conversion of $LiO_2$ to $Li_2O_2$ ($Li^+ + e^- + LiO_2 \rightarrow Li_2O_2$) with 96% of the theoretical capacity for this reaction is attained. This is clear evidence that a reaction involving one-electron per $O_2$ in the first cycle for 1000 mAh/g capacity is being observed, and that no $Li_2O_2$, crystalline or amorphous, forms on this capacity limited discharge.

The stability of the $LiO_2$ was investigated by carrying out XRD measurements on Ir-rGO cathodes aged for different times in the presence of the electrolyte (FIG. 3A). After twelve hours at the end of both the first and second discharges they show only evidence for crystalline $LiO_2$. When the discharge product is allowed to sit for seven days under the same conditions, both samples still show mostly signature of $LiO_2$ with a small presence of crystalline $Li_2O_2$. Thus, the XRD measurements indicate that the crystalline $LiO_2$ formed with the Ir-rGO cathode is surprisingly stable for a relatively long period of time. In addition, $LiO_2$ is still the dominant discharge product on the $20^{th}$ discharge cycle indicating that $LiO_2$ is stable enough that it can be repeatedly charged and discharged for about 40 cycles with a very low charge potential (about 3.2 V).

It was observed that an $Ir_3Li$ intermetallic phase formed on the large iridium agglomerates seen in the backscattering image (See FIG. 5B), as shown in FIGS. 3F/G. Nanoparticles (needle-like or rod-like) formed on the surface of these agglomerates during the $1^{st}$ discharge (FIG. 3E). It is interesting to point out that the $Ir_3Li$ intermetallic phase has a similar crystallographic space group (orthorhombic) to that of $LiO_2$. Without being bound by theory, it is believed that the $Ir_3Li$ intermetallic phase supports $LiO_2$ formation by templating the growth of the crystalline $LiO_2$, due to a lattice matching.

Figure 9A:
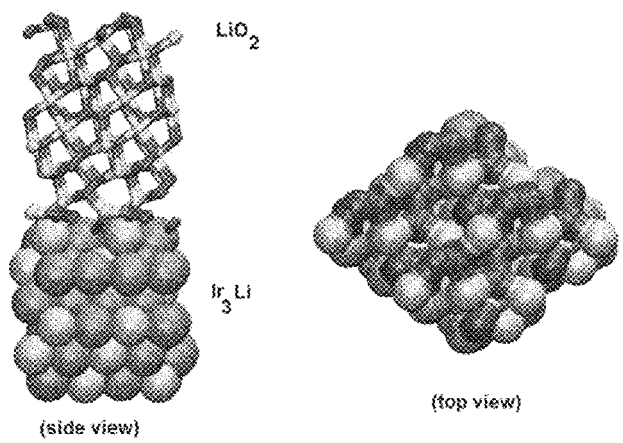
FIG. 9A illustrates the configuration (top and side view) of epitaxial growth of $LiO_2$ crystals (i.e. in $P_{nnm}$ orthorhombic lattice) in a (111) orientation on a (121) facet of $Ir_3Li$ (i.e. in the $I_{mm2}$ orthorhombic lattice) crystalline substrate.
Figure 9B:
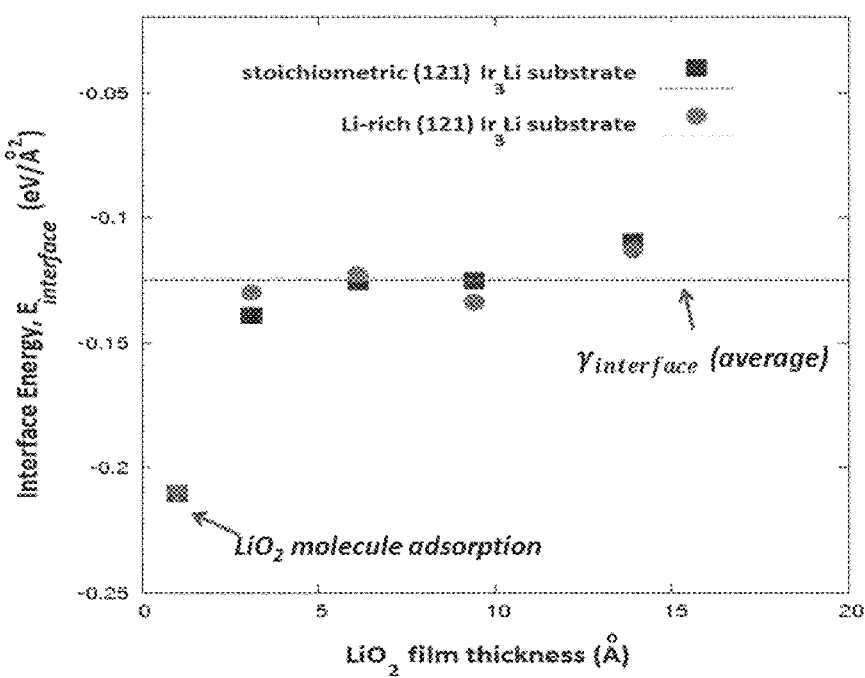
FIG. 9B is a graph showing the basis of the preferred orientation growth of $LiO_2$ on $Ir_3Li$ is supported by the low interfacial energy $\gamma_{interface}$ (in $eV/Å^2$) based on DFT calculations.

Density functional theory (DFT) calculations were carried out on the interface between $LiO_2$ and $Ir_3Li$. FIG. 9A illustrates the configuration (top and side view) of epitaxial growth of $LiO_2$ crystals (i.e. in $P_{mnm}$ orthorhombic lattice) in a (111) orientation on a (121) facet of $Ir_3Li$ (i.e. in the $I_{mm2}$ orthorhombic lattice) crystalline substrate. From DFT calculations, the lattice mismatch between the $LiO_2$ crystalline film and the $Ir_3Li$ substrate is only about 0.25 Å in both the a and b lattice of $LiO_2$ (or about +6.3% and −5.1% in the a and b lattice of $LiO_2$ crystal). FIG. 9B is a graph showing the basis of the preferred orientation growth of $LiO_2$ on $Ir_3Li$ is supported by the low interfacial energy $\gamma_{interface}$ (in $eV/Å^2$) based on DFT calculations. As shown in 9B, the average interface energy $\gamma_{interface}$ is about −0.12 $eV/Å^2$ based on different thicknesses of $LiO_2$ film on two different $Ir_3Li$ substrates (i.e. stoichiometric and Li-rich). Based on the DFT calculated $\gamma_{interface}$ (interface energy), $\gamma_{substrate}$ (substrate surface energy) and $\gamma_{film}$ (film surface energy), we found $\gamma_{substrate} \geq \gamma_{film} + \gamma_{interface}$, which follows the Frank-van der Merwe mode in epitaxial growth model (J. H. van der Merwe, in R. Vanselow (ed.), *Chemistry and Physics of Solid Surfaces*, CRC Press, Boca Raton, Fla., 1979, p. 209).

The kinetic stability of crystalline and amorphous $LiO_2$ was investigated using ab initio molecular dynamics (AIMD) and density functional theory (DFT) with the results shown in FIG. 4. The disproportionation rate will depend on several factors. One factor is the rate at which the $O_2$ leaves the surface. The DFT results in FIG. 4A indicate that the initial step of $O_2$ leaving the clean surface into vacuum has a barrier of about 0.9 eV, based on one of the low energy $LiO_2$ surfaces. FIG. 4B shows that crystalline $LiO_2$ surfaces (i.e. (101) and (111)) are thermally stable in vacuum at room temperature. For an amorphous surface, the barrier is less (about 0.3 eV) than for the crystalline surface as shown in FIG. 4C. From AIMD simulations, the presence of electrolyte molecules adsorbed on the amorphous $LiO_2$ surface reduces $O_2$ desorption. This suggests that adsorbed electrolyte on the $LiO_2$ surface may prevent disproportionation of the crystalline phase. The other factor controlling the disproportionation rate is the barrier to reorganization of the $LiO_2$ atomic positions allowing for $O_2$ diffusion to the surface to replace the missing surface $O_2$. The barriers for this are likely to be large in a crystal lattice, which can also contribute to the unexpected stability of crystalline $LiO_2$.

Figure 4B:
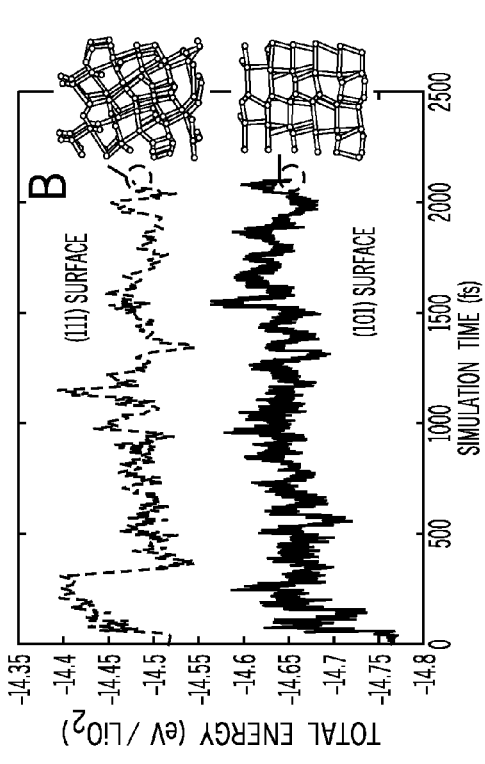
FIGS. 4A, 4B, 4C, and 4D are illustrative of density functional calculations.
Figure 4D:
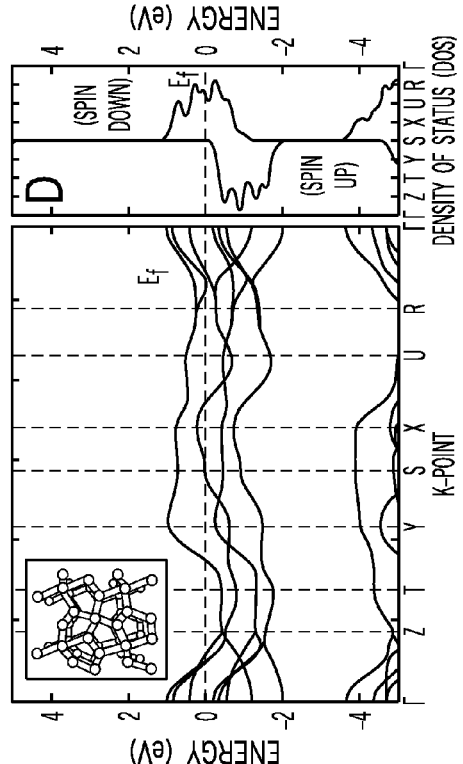
Figure 4A:
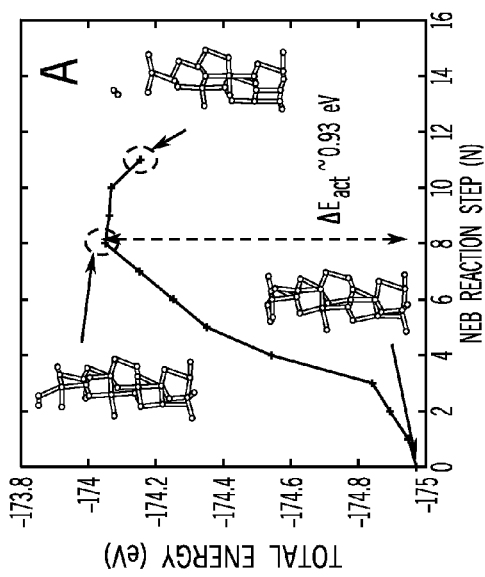
Figure 4C:
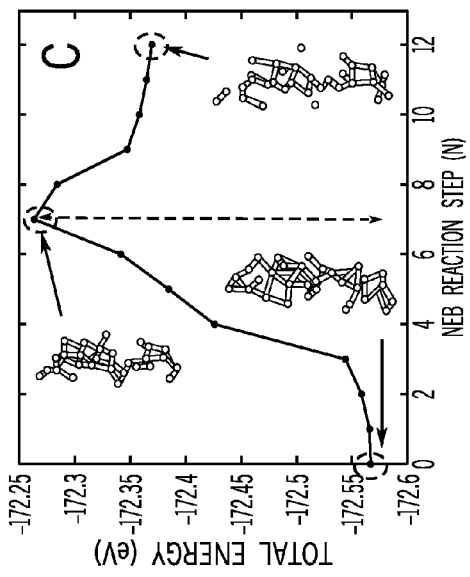

The Ir-rGO cathode also exhibits a low charge potential, which may be due to several factors. As shown in FIG. 4D, crystalline $LiO_2$ is a half metal based on density functional calculations, and, thus, will have good electronic conduction in contrast to insulating bulk $Li_2O_2$. Ir is a good oxygen evolution catalyst and it interacts strongly with $LiO_2$ to form a good interface for electrical contact. These properties may explain why the discharge product formed on just rGO has a large charge potential, i.e., it lacks the Ir nanoparticles. The lithium air cell based on Ir-rGO cathode material also can cycle for as much as 40 cycles before failure (FIG. 2A), similar to what has been found for $Li_2O_2$ based Li—$O_2$ cells, indicating that the lithium superoxide is not any more reactive towards the electrolyte than lithium peroxide. In addition, the low charge potential will lead to less side reactions. The failure of the cell could be due to both oxygen crossover to the anode resulting in the anode being converted to LiOH (See FIG. 10) and poisoning of Ir metal catalyst with cycling.

Characterization.

The phase structures of the discharge products were identified using high energy X-ray diffraction (HE-XRD) with a wavelength of 0.11165 Å, performed at beamline 11ID-C of Sector 11 at the Advanced Photon Source (APS) of Argonne National Laboratory. The X-ray specimens were sealed with Kapton tape as a protective film in the glove box to avoid side reactions with air. The XRD patterns were collected in the transmission mode. During the course of the measurements, a high-energy X-ray beam hit the sample horizontally, and a 2D detector (Perkin Elmer large area detector) was used to collect the X-ray diffraction profiles using transmission mode. The 2D patterns were then integrated into conventional 1D patterns (intensity vs. 2θ) for final data analysis using the Fit2d software.

Scanning transmission electron microscopy (TEM, JEOL JEM-2100F FEG FasTEM with an accelerating voltage of 80 kV) was employed to evaluate the morphology and particle size of the Ir catalysts and the discharge products on the porous cathodes. Spherical and chromatic aberration correction enables the microscope to reach the information limit better than 0.1 nm (measured by Young's fringes) at 80 kV. To prepare the TEM specimens, a dilute suspension was prepared by ultrasonically dispersing the samples in ethanol for 5 min, and a drop of the suspension was placed onto a copper grid and dried. Particle size histograms were generated from the TEM images using software ImageJ. Field-emission scanning electron microscopy (SEM, Hitachi S-4700) coupled with backscattering electron imaging (BSE) was employed to determine the morphology and estimate the particle size of Ir catalyst and discharge products.

Figure 11:
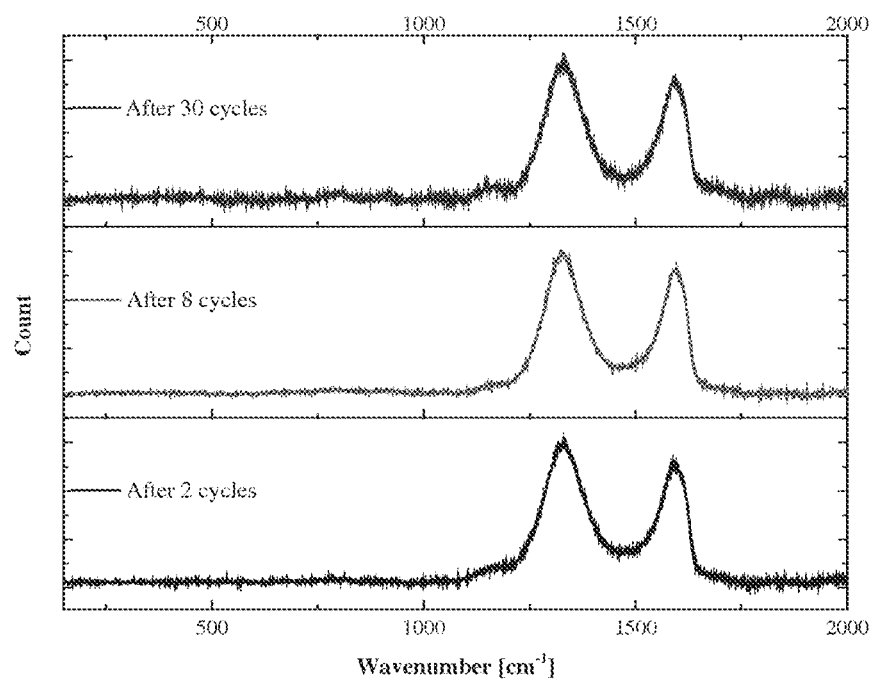
FIG. 11 is a Raman spectra of charged Ir-rGO cathode (from discharge cathode capacity=1000 mAh/g, current density=100 mAh/g) after 2, 8, and 30 cycles.
Figure 12:
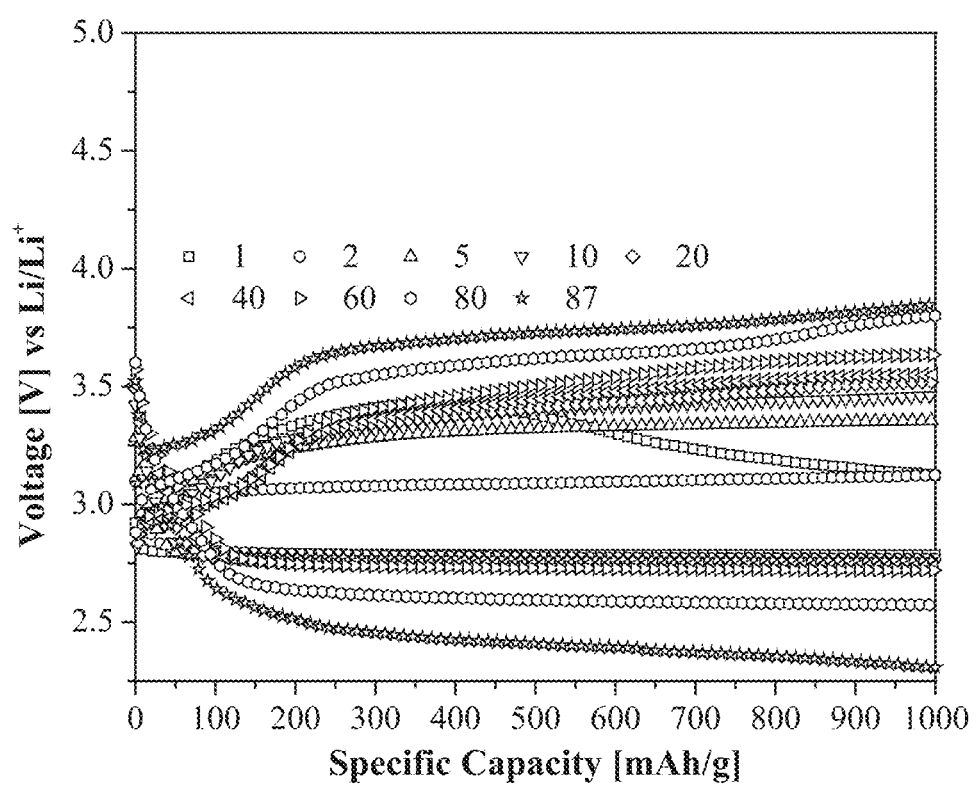
FIG. 12 is a graph of cycling data for a coin cell using the Ir-rGO cathode. The coin cell cycles for more than 80 cycles compared to the swagelok cell, which runs for about 40 cycles.

Raman spectra of the discharged cathode were obtained using a Renishaw 2000 or inVia microscope spectrometer with a HeNe laser at exciting wavelength of 633 nm. The sample was loaded inside of a glove box to a gas-tight Raman cell with glass or quartz window. Raman spectrum collection was set up in a 180° reflective mode. Roughly 10% of the maximum 13 mW laser intensity was applied. Collection time constant setting varied from 30 seconds to about 100 seconds. There is no evidence of any significant side reactions in the Raman data for the first discharge cycle (FIG. 3) or from Raman and FTIR data for after charging for up to 30 cycles (See FIGS. 11 and 15A/B). These also confirm that the discharge product is consumed upon charging.

Theoretical Calculations.

To study the stability of $LiO_2$ systems (i.e. crystal, crystalline surfaces, amorphous-like thin films) and its interface with an electrolyte, we carried out Density Functional Theory (DFT) calculations with plane wave basis sets as implemented in the VASP code. P. Hartmann et al., *Nat. Mater.* 12, 228 (2013). All calculations were spin-polarized and carried out using the gradient corrected exchange-correlation functional of Perdew, Burke and Ernzerhof (PBE) under the projector augmented wave (PAW) method, with plane wave basis sets up to a kinetic energy cutoff of 400 eV. X. Ren, Y. Wu, *J. Am. Chem. Soc.* 135, 2923 (2013). The PAW method was used to represent the interaction between the core and valence electrons, and the Kohn-Sham valence states (i.e. is for H, 2s for Li, 2s 2p for C and O) are expanded in plane wave basis sets. Laoire et al. *J. Phys. Chem. C* 113, 20127 (2009). For the geometry optimization and Nudge Elastic Band calculations, the convergence criterion of the total energy was set to be within $1\times10^{-5}$ eV for the K-point integration, and all the atoms and geometries were optimized until the residual forces became less than $1\times10^{-2}$ eV/Å.

For $LiO_2$ crystals, the calculation is based on a mesh of 9×9×9 in K-point grid. For both the crystalline and amorphous-like $LiO_2$ thin film surfaces, the K-point grid of 6×6×1 was used. For the Ab Initio Molecular Dynamics (AIMD) simulations, all the calculations were carried out with the convergence criterion of the total energy set to be within $1\times10^{-4}$ eV in kinetic energy cutoff of 300 eV. For the simulations of $LiO_2$ surfaces with the electrolyte molecules, the Van der Waals method of Grimme (i.e. DFT-D2) is used throughout both the DFT and AIMD calculations. Abraham et al. *J. Electrochem. Soc.* 143, 1 (1996). For the simulation of the electrolyte, a smaller ether solvent molecule, i.e. dimethoxy ethane (DME) is used instead of TEGDME in order to reduce the computational cost. To investigate the thermodynamic stability of the system at room temperature, all the structures from the DFT optimizations were then thermally equilibrated at T=300K using AIMD simulations based on an Nose-Hoover NVT-ensemble with a time step of 1 femtosecond.

FIG. 5 shows SEM images of the Ir-rGO cathode. FIG. 5A is the secondary electron image, while FIG. 5B is the backscattering image.

Figure 6:
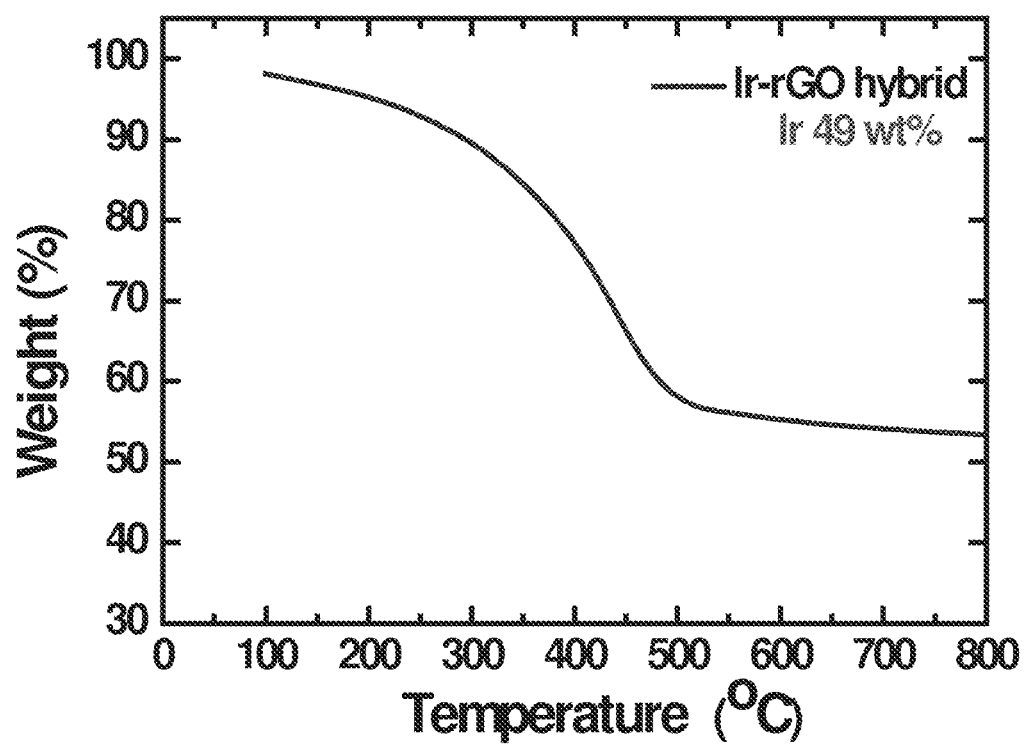
FIG. 6 is a TGA curve of Ir-rGO, according to the examples.
Figure 7B:
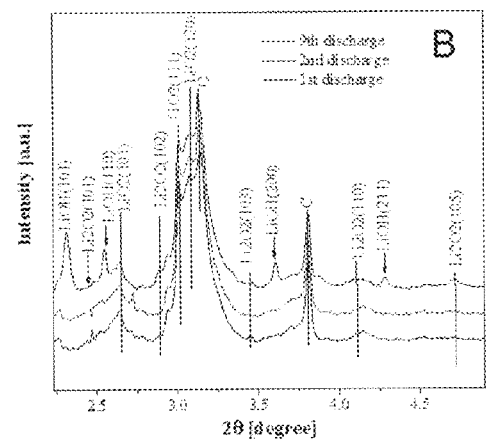
FIG. 7B is an XRD of a discharge product from the rGO cathode, according to the examples.
Figure 8:
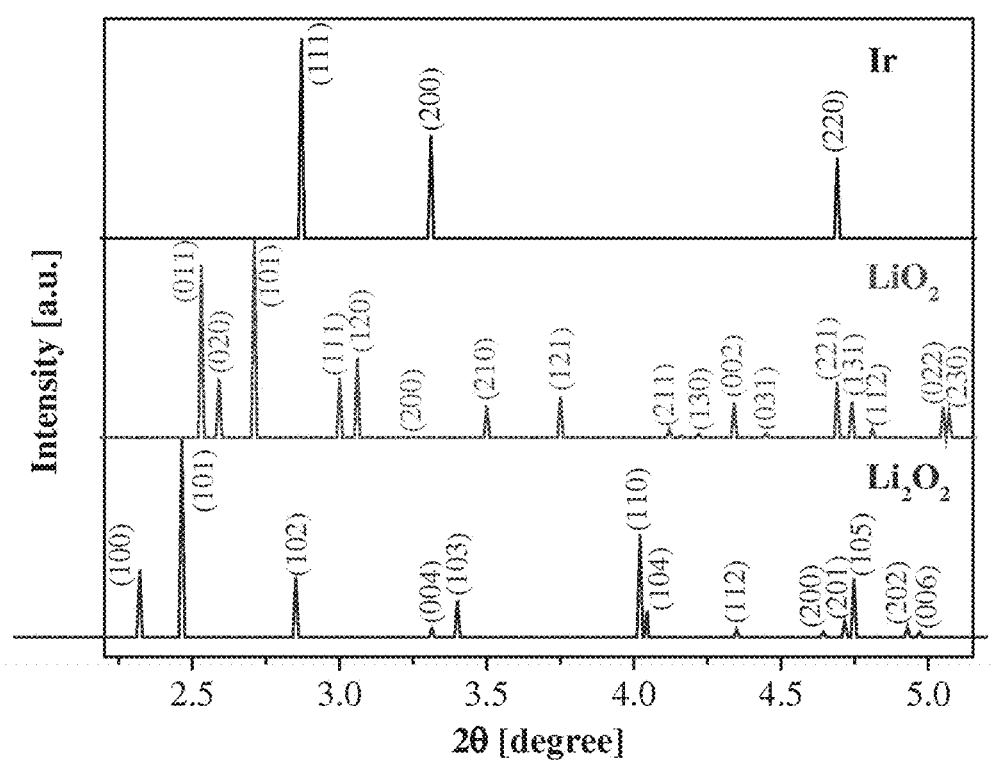
FIG. 8 is a calculation of a theoretical ($LiO_2$) XRD pattern derived from the DFT prediction of crystalline $LiO_2$, and experimental XRD patterns for crystalline $Li_2O_2$ and Ir at a wavelength of 0.11165 Å.
Figure 10A:
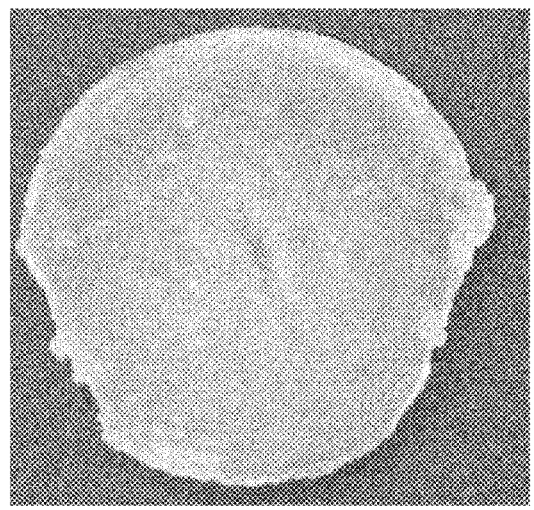
FIG. 10A is a lithium-metal anode converted to LiOH after the cell failed.
Figure 10B:
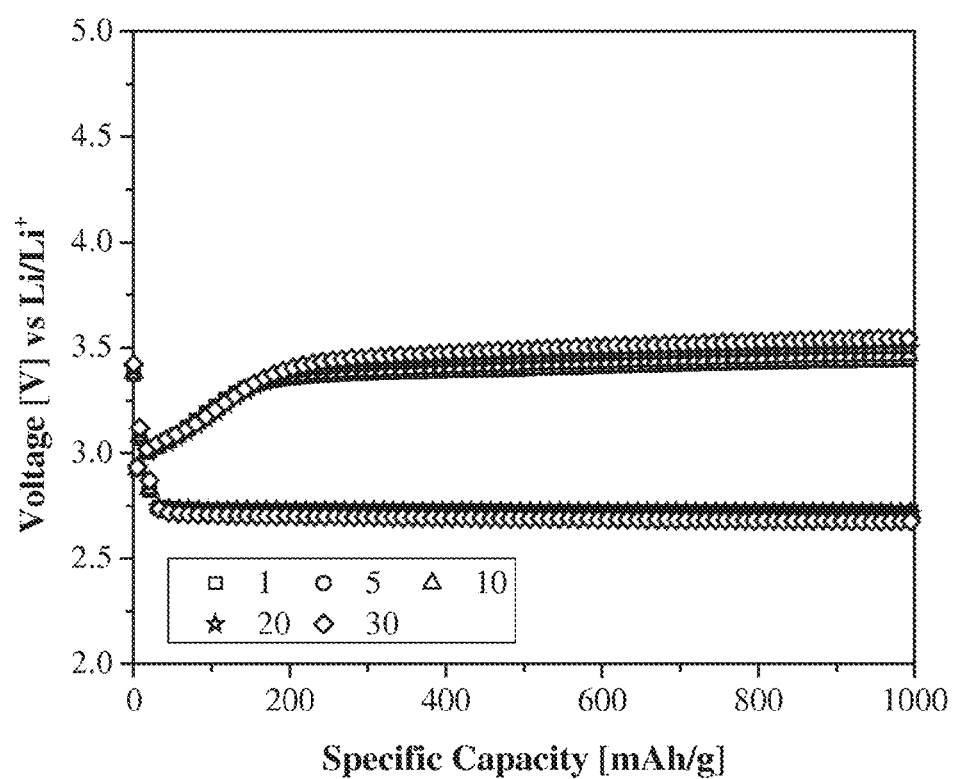
FIG. 10B is the voltage profile after replacement of the Li anode with a new one.

FIG. 6 is thermogravimetric analysis (TGA) curves of Ir-rGO. The iridium content of the Ir-rGO composite was determined to be 49 wt % Ir. The Brunauer-Emmett-Teller (BET) specific surface area of the pristine rGO powder and the Ir-rGO composite is 51.7 $m^2/g$ and 342 $m^2/g$, respectively. The pore volume is 0.049 $cm^3/g$ and 0.3136 $cm^3/g$ for the corresponding samples. Because the Ir nanoparticles supported on rGO can prevent the re-stacking of rGO sheets during the drying process, the Ir-rGO composite shows higher porosity. FIG. 7A is an SEM image of a discharge product from the rGO cathode, while FIG. 7B is an XRD of the discharge product from rGO cathode. The results in FIG. 7 provide additional evidence that Ir nanoparticles are responsible for the LiO2 in the discharge product FIG. 8 provides the theoretical ($LiO_2$) XRD pattern derived from the DFT predicted crystalline $LiO_2$, and experimental XRD patterns for crystalline $Li_2O_2$ and Ir under the wavelength 0.11165 Å. FIG. 9A is an illustration of the AIMD time evolution of total energy of an amorphous-like $LiO_2$ thin film surface thermally equilibrated at 300K for 2 picoseconds in simulation time. As shown, the under-coordinated superoxide ($O_2$) bonded on the amorphous-like $LiO_2$ surface tends to desorb as an $O_2$ molecule (resulting in disproportionation) when exposed to a vacuum. In FIG. 9B the AIMD time evolution of total energy of the amorphous-like $LiO_2$ thin film surface covered by a thin layer of dimethoxy ethane (DME) molecules thermally equilibrated at 300K for 2 ps in simulation time. In contrast to the bare surface in FIG. 9A, the adsorbed DME molecules (ΔE about −0.6 eV/DME-molecule) seem to suppress the under-coordinated superoxide ($O_2^-$) species bonded on the amorphous-like $LiO_2$ surface from desorption (which would result in disproportionation). There is no $O_2$ molecule release during the simulation. Finally, FIG. 10 is a photograph of a lithium metal anode converted to LiOH after cell failure.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition comprising $LiO_2$, reduced graphene oxide, and a metal catalyst or residue thereof.

2. The composition of claim 1, which is free of $Li_2O_2$ and $Li_2O$.

3. The composition of claim 1, wherein the metal catalyst comprises a metal that forms an intermetallic phase with lithium, and the intermetallic phase has an orthorhombic structure.

4. The composition of claim 3, wherein the intermetallic phase is $Ir_3Li$.

5. The composition of claim 1, wherein the metal catalyst comprises Ir, Ru, Pt, or Pd.

6. The composition of claim 1, wherein the metal catalyst comprises Ir.

7. The composition of claim 1, wherein the $LiO_2$ is crystalline $LiO_2$.

8. An electrochemical cell comprising:
   an anode comprising lithium metal;
   a cathode comprising $LiO_2$, reduced graphene oxide, and a metal catalyst or residue thereof, wherein the cathode is substantially free of $Li_2O_2$ and $Li_2O$; and
   an electrolyte.

9. The electrochemical cell of claim 8, wherein the electrolyte comprises a solvent and a lithium salt.

10. The electrochemical cell of claim 9, wherein the solvent comprises an ether-based solvent, a fluorinated ether-based solvent, an oligo(ethylene oxide) solvent, or a mixture of any two or more thereof.

11. The electrochemical cell of claim 9, wherein the lithium salt comprises $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$), lithium alkyl fluorophosphates, $Li(C_2O_4)_2$, $LiBF_2C_2O_4$, $Li_2B_{12}X_{12-p}H_p$, $Li_2B_{10}X_{10-y}H_y$, or a mixture of any two or more lithium salts, where X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10.

12. An electrochemical cell comprising:
   an anode comprising lithium metal;
   a cathode comprising $LiO_2$, reduced graphene oxide, and a metal catalyst or residue thereof; and
   an electrolyte.

13. The electrochemical cell of claim 12, wherein the electrochemical cell is a closed electrochemical cell.

14. A process of forming $LiO_2$, the process comprising:
   providing an electrochemical cell, the electrochemical cell comprising a porous oxygen carbon cathode, a lithium anode, a current collector, and an electrolyte; and
   discharging the electrochemical cell to form a discharge product;
   wherein:
      the discharge product comprises $LiO_2$;
      the porous oxygen carbon cathode comprises reduced graphene oxide and a catalyst; and
      the discharge product is free of $Li_2O$ and $Li_2O_2$.

15. The process of claim 14, wherein the $LiO_2$ exhibits a Raman absorption peak at 1123 $cm^{-1}$, and x-ray diffraction (2θ) peaks of 2.530, 2.590, 2.710, and 3.000 while being void of (2θ) peaks of 2.321, 2.464, 2.851, 3.400, 4.020, and 4.747.

* * * * *